United States Patent

[11] 3,620,282

| [72] | Inventor | Frank Newton<br>Stockton-on-Tees, England |
|---|---|---|
| [21] | Appl. No. | 9,712 |
| [22] | Filed | Feb. 9, 1970 |
| [45] | Patented | Nov. 16, 1971 |
| [73] | Assignee | Imperial Chemical Industries Limited<br>London, England |
| [32] | Priority | Feb. 19, 1969 |
| [33] | | Great Britain |
| [31] | | 8,935/69 |

[54] FALLING FILM EVAPORATOR FOR CONCENTRATING LIQUIDS
5 Claims, 3 Drawing Figs.

[52] U.S. Cl....................................... 159/13 C,
159/31, 55/424
[51] Int. Cl....................................... B01d 1/22,
B01d 1/00
[50] Field of Search........................... 159/13, 13
A, 13 B, 13 C, 31, 14; 55/183, 185, 257, 392, 393,
398, 416, 424, 426, 427; 261/DIG. 11

[56] References Cited
UNITED STATES PATENTS

| 3,081,987 | 3/1963 | Meek et al. .................... | 261/112 |
| 3,491,821 | 1/1970 | Graumann et al. ............ | 159/13 C |
| 3,147,174 | 9/1964 | Cook............................. | 159/47 U |
| 3,494,109 | 2/1970 | Blazer et al. ................... | 55/257 |
| 3,087,533 | 4/1963 | Graumann et al. ............ | 159/13 C |
| 2,612,359 | 9/1952 | Simpson........................ | 261/112 |

OTHER REFERENCES
2612359 261- Cooling Tower

Primary Examiner—Norman Yudkoff
Assistant Examiner—J. Sofer
Attorney—Cushman, Darby & Cushman ABSTRACT: In a falling film evaporator for separating or concentrating liquids, drops from the evaporator tubes fall onto and between parallel inclined baffle plates provided below said tubes and the inlet for a hot airstream, the inclined baffle plates minimizing the disintegration of the drops into smaller droplets and, by shielding them from said hot airstream, minimizing entrainment of said smaller droplets back up said tubes by said hot airstream.

PATENTED NOV 16 1971 3,620,282
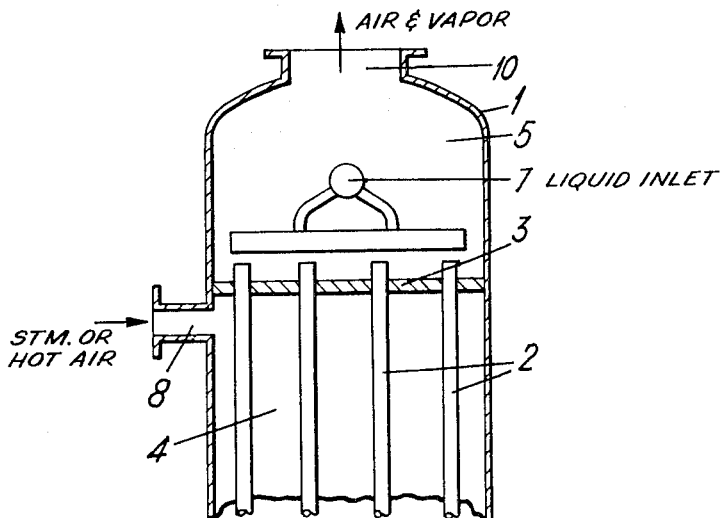
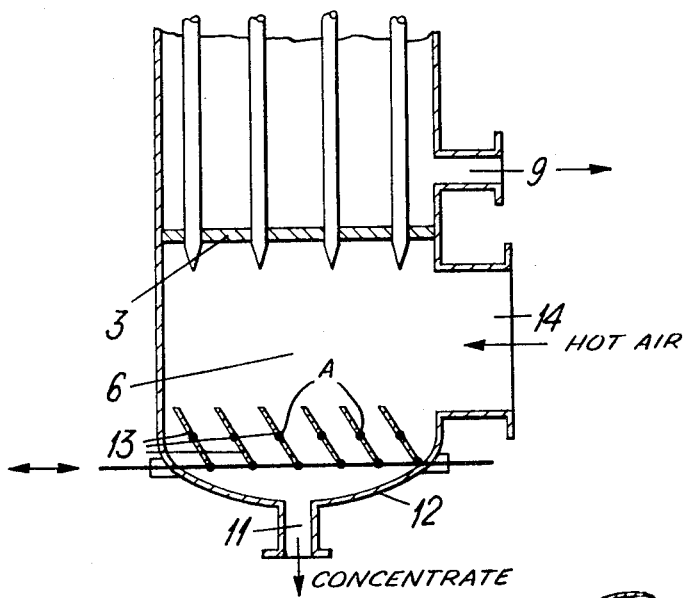
*Fig. 1.*
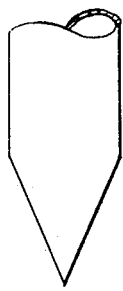
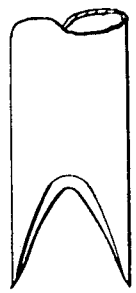
*Fig. 2.*  *Fig. 2A.*
Inventor
Frank Newton
By Cushman, Darby & Cushman
Attorneys

FALLING FILM EVAPORATOR FOR CONCENTRATING LIQUIDS

The present invention relates to an apparatus for separating liquids having different boiling points, of the type commonly known as a "falling film evaporator." A "falling film evaporator" may be described, briefly, as a long, vertically disposed, usually cylindrical, chamber containing a large number of vertically disposed evaporator tubes, of relatively small bore, which are held in position, at or near their upper and lower ends, by solid tube plates which effectively subdivide the cylindrical chamber into an upper chamber, a central chamber and a lower chamber; the insides of the tubes are completely sealed off from the central chamber which surrounds them, but on the other hand, the upper and lower chambers communicate with each other by means of the insides of the tubes. Falling film evaporators, such as described hereinabove, are frequently used to concentrate relatively dilute solutions by vaporizing off part of the solvent, and are particularly useful for concentrating aqueous solutions or melts of such substances as ammonium nitrate and urea.

In practice, the mixture of liquids to be separated (or a relatively dilute solution which it is desired to concentrate, as the case may be) is introduced into the upper chamber and flows, as a thin film, down the inner surfaces of the tubes. A hot fluid may be introduced into the central chamber surrounding the tubes, and the heat thus applied to the outsides of the tubes is conducted through the walls thereof to the liquid film on the inside, thereby vaporizing the more volatile of the liquids (or the solvent, as the case may be). To accelerate the rate of vaporization and removal of the vapors so formed, a hot airsteam is introduced into the lower chamber through an appropriate inlet duct and passes vertically upwardly through the tubes into and out of the upper chamber through an appropriate outlet provided in the upper chamber. The separated (or partially separated) less volatile liquid (or the concentrated solution, as the case may be) continues to flow, as a thin film, down the inner surfaces of the tubes and falls from the lower ends thereof, through the above-mentioned hot airstream introduced into the lower chamber, into the bottom of the lower chamber, whence it is collected and removed through an appropriate outlet. It is common practice to profile the bottom end of each of the tubes so as to reduce, as far as possible, the quantity of drop formation of the separated (or partially separated) less volatile liquid (or the concentrated solution, as the case may be) leaving the bottom ends of the tubes.

We have found, however, that falling film evaporators, as described above, are subject to certain disadvantages, resulting in reduced efficiency, due to the airstream which is introduced in the lower chamber entraining small droplets of the less volatile liquid or the concentrated solution, and returning these small droplets back into and up through the tubes into the upper chamber. The quantity of liquid entrained is dependent on the number of small droplets of separated liquid or concentrated solution formed, and the upward velocity of the airstream introduced into the lower chamber.

There are two points of maximum small droplet formation:
a. Where the stream or drops of the separated liquid or concentrated solution fall onto a flat plate or like surface positioned substantially normal to the direction of the liquid flow, i.e., at the bottom of the lower chamber, the maximum number of small droplets are formed. (The more the surface of the plate or like surface is inclined towards the vertical, the more the small droplet formation is reduced to a minimum). Depending on the droplet size and the velocity of the hot airstream introduced into the lower chamber, a large proportion of the small droplets may be entrained by the airstream.
b. Where the separated liquid or concentrated solution leaves the bottom end of the tubes, particularly if the general direction of the hot airstream introduced into the lower chamber is in any direction other than vertically upwards; as this is the point at which the said airstream enters the tubes, entrainment of the small droplets into the tubes will ensue.

It is therefore evident that to obtain minimum small droplet entrainment, small droplet formation must be reduced to a minimum. Furthermore, any small droplets formed must be shielded from the hot airstream introduced into the lower chamber. The velocity of said airstream in the lower chamber should therefore be low, and the airstream should not be accelerated until it enters the tubes.

We have overcome these difficulties, according to the present invention, by ensuring that the drops fall onto one or more sloping surfaces and in fact we provide, across the bottom part of the lower chamber (in what may be called the collecting vessel), a plurality of substantially parallel baffle plates inclined to the horizontal, onto and between which the drops of separated liquid or concentrated solution fall, so that their disintegration into smaller droplets is minimized.

Obviously, the more closely the inclination of these baffle plates approaches the vertical, the less will be the disintegration of the drops into smaller droplets. The baffle plates are located below the inlet duct for the incoming hot airstream, and are inclined in a direction such that the small droplets formed between the baffle plates are substantially shielded from the airstream and cannot therefore become entrained thereby. It is a very important advantage of our invention that this arrangement of the baffles plates does not reduce the space available for the inlet duct for the introduction of the hot airstream into the lower chamber nor the horizontal cross-sectional area of the lower chamber, thereby enabling low inlet and rising air velocities to be achieved.

The disintegration into smaller droplets of the separated liquid or concentrated solution, while it is falling from the bottom ends of the tubes to the baffle plates, is reduced by reducing the velocity of the incoming hot airstream by the simple expedient of increasing the cross-sectional area of the hot air inlet duct. Without wishing to limit ourselves to specific figures (which are in any case, dependent on a large number of factors, including the length and diameter of the lower chamber and the number of tubes in the falling film evaporator) we find that the horizontal air velocity into the collecting chamber is preferably very low indeed (e.g., of the order of 4 ft./sec.) and that the rising air velocity within the collecting chamber is preferably even lower (e.g., of the order of 1.7 ft./sec.), at which velocities there will be little or no disintegration into small droplets of the falling separated liquid or concentrated solution. The hot airstream is accelerated once it enters the bottom ends of the tubes.

In accordance with the present invention, we accordingly provide a falling film evaporator wherein the bottom of the lower chamber (or collecting vessel) below the lower ends of the evaporator tubes is provided with a plurality of substantially parallel baffle plates inclined to the horizontal, onto and between which the drops from the said tubes fall, the said baffle plates being located below an inlet for a hot airstream introduced into said lower chamber, the direction and angle of inclination of said baffle plates being such as to shield the spaces between said baffle plates from said hot airstream, thereby minimizing disintegration of the drops of the separated liquid or concentrated solution into smaller droplets and the entrainment of any such smaller droplets formed. This has the added advantage that low air velocities may be used throughout the lower chamber.

Preferably, the velocity of the hot airstream introduced into the lower chamber is reduced to a minimum, depending upon the air volume requirements for the process, by enlarging the cross-sectional area of the inlet therefor.

The invention is hereinafter described, by way of example only, with reference to the drawings accompanying the Provisional Specification, wherein:-

FIG. 1 is a sectional view of the improved falling film evaporator according to the present invention;

FIGS. 2 and 2A are, respectively, a front and side view of the lower end of one of the evaporator tubes of the falling film evaporator illustrated in FIG. 1.

The falling film evaporator illustrated in the drawings comprises a cylindrical vessel 1 containing a number of vertically disposed evaporator tubes 2 of relatively small bore, which are held in position, at or near their upper and lower ends, by solid tube plates 3 which subdivide the vessel 1 into a middle chamber 4, and upper and lower chambers 5 and 6 respectively. The insides of the tubes 2 are completely sealed off from the middle chamber 4 surrounding the outsides of the tubes. The upper chamber 5 and the lower chamber 6 however, communicate with each other by means of the insides of the tubes 2.

The mixture of liquids to be separated (or the solution to be concentrated) is introduced into the upper chamber 5 through an inlet 7 and flows, as a film, down the inner surfaces of the tubes 2. A hot fluid, for example steam or hot air, is introduced through an inlet 8 into the middle chamber 4, and the heat thus supplied to the outer surfaces of the tubes 2 is conducted through the walls of the tubes to the liquid film on their insides, thereby vaporizing the more volatile of the liquids (or the solvent) in the tubes, before leaving the chamber 4 via an outlet 9. To accelerate the rate of vaporization and to remove the vapors formed, a hot airstream is introduced into the bottom chamber 6 and passes vertically upwards through the insides of the tubes 2 into and out of the upper chamber 5 via an outlet 10. The now partially separated less volatile liquid (or the concentrated solution) continues as a film down the inner walls of the tubes and falls in the form of drops from their lower ends, through the hot airstream in the lower chamber 6, into the bottom of said lower chamber, and then out of the lower chamber through an outlet 11. It is common practice to profile the bottom end of each of the tubes 2 as shown in FIGS. 2 and 2A. This reduces the number (and therefore increases the size) of the drops of separated liquid or concentrated solution formed at and falling from the bottom ends of the tubes 2.

We have found, however, that the falling film evaporator, as described above, is subject to certain disadvantages resulting in reduced efficiency due to the hot airstream in the lower chamber 6 entraining small droplets of the separated liquid or concentrated solution in the chamber 6, and carrying them back into and up through the tubes 2 into the upper chamber 5. The quantity of liquid entrained is dependent on the number of small droplets of separated liquid or concentrated solution formed, and on the upward velocity of the hot airstream in the lower chamber 6. To obtain minimum droplet entrainment, the number of small droplets formed should be reduced to a minimum, and, as far as possible, the small droplets formed should be shielded from the hot airstream; the velocity of the hot airstream in the lower chamber 6 should be as low as possible, and should not be accelerated until it enters the tubes 2.

We have overcome these difficulties, according to the invention, by ensuring that the drops fall on to one or more sloping surfaces; to this end, we provide, across the bottom of the lower chamber 6, which also acts as collecting vessel 12, a plurality of substantially parallel baffle plates 13 which are inclined to the horizontal, onto and between which the drops fall, so that their disintegration into smaller droplets is minimized.

The baffle plates 13 are located below an inlet duct 14 for the incoming hot airstream and are inclined in such a direction and at such an angle to the horizontal that any small droplets formed between the baffle plates 13 are shielded from the airstream and cannot therefore become entrained thereby.

The disintegration into small droplets of the separated liquid or the concentrated solution as it falls from the bottom ends of the tubes 2 to the baffle plates 13 is reduced by reducing the velocity of the incoming hot airstream, for example by the simple expedient of increasing the cross-sectional area of the hot air inlet duct 14.

The baffle plates 13 may conveniently be adjustable so as to vary their angle of inclination to the horizontal; for this purpose, they may be pivotably mounted upon one or more movable supporting rods (not illustrated), actuation of which will alter said angle of inclination of the baffle plates 13 to a desired degree.

I claim:

1. A falling film evaporator for liquids comprising a vertically disposed vessel, a plurality of hollow evaporator tubes maintained in a vertical position within said vessel, at least two tube plates contained within said vessel, said tube plates being adapted to hold said tubes near their upper and lower ends and to subdivide said vessel into an upper chamber, a central chamber and a lower chamber so that said upper and lower chambers are in communication with each other through said hollow tubes, a lateral inlet for the introduction into said lower chamber of a stream of hot gas, a plurality of substantially parallel inclined baffle plates mounted in said lower chamber onto and between which baffle plates drops of liquid fall from the bottom ends of said tubes, said baffle plates being located below said inlet for said hot gas and inclined at an angle and in a direction away from the gas inlet such as to shield said droplets from said hot gases and to minimize disintegration of said drops into smaller droplets when they strike the baffles.

2. A falling film evaporator for liquids, comprising a vertically disposed vessel, a plurality of hollow evaporator tubes maintained in a vertical position within said vessel, at least two tube plates contained within said vessel, said tube plates being adapted to hold said tubes near their upper and lower ends and to subdivide said vessel into an upper chamber, a central chamber and a lower chamber so that said upper and lower chambers are in communication with each other through said hollow tubes a lateral inlet for the introduction into said lower chamber of a stream of hot gas, a plurality of substantially parallel inclined baffle plates mounted in said lower chamber onto and between which baffle plates drops of liquid fall from the bottom ends of said tubes, and including at least one movable supporting rod provided in said lower chamber, said baffle plates being mounted upon and pivoted to said rod, and means for actuating said rod so as to alter the direction and angle of inclination of said baffle plates to a desired degree away from the gas inlet such as to shield said droplets from said hot gases and to minimize disintegration of said drops into smaller droplets when they strike the baffles.

3. A falling film evaporator as claimed in claim 1, wherein said gas is air.

4. A falling film evaporator as claimed in claim 1, including means for reducing the inlet velocity of said hot gas stream in order to reduce entrainment of drops of liquid in said lower chamber.

5. A falling film evaporator as claimed in claim 4, wherein said means comprises an inlet duct for said hot gas stream, said inlet duct being of sufficiently large cross-sectional area to reduce the inlet velocity of said hot gas stream to a desired degree.

* * * * *